(12) United States Patent
Simms et al.

(10) Patent No.: US 12,034,395 B2
(45) Date of Patent: Jul. 9, 2024

(54) APPARATUS AND METHODS FOR REDUCED VOLTAGE STARTING OF MOTORS WITH BUMPLESS FORCE TRANSITION

(71) Applicant: Eaton Intelligent Power Limited, Dublin (IE)

(72) Inventors: Stan R. Simms, Arden, NC (US); Thomas A. Farr, Arden, NC (US); Gabriel Teixeira Braga, Belo Horizonte (BR)

(73) Assignee: Eaton Intelligent Power Limited, Dublin (IE)

( * ) Notice: Subject to any disclaimer, the term of this patent is extended or adjusted under 35 U.S.C. 154(b) by 23 days.

(21) Appl. No.: 18/052,879

(22) Filed: Nov. 4, 2022

(65) Prior Publication Data

US 2024/0154552 A1      May 9, 2024

(51) Int. Cl.
    *H02M 1/34*    (2007.01)
    *H02P 6/21*    (2016.01)

(52) U.S. Cl.
    CPC ..................... *H02P 6/21* (2016.02)

(58) Field of Classification Search
    CPC ........................................................ H02P 6/21
    See application file for complete search history.

(56) References Cited

U.S. PATENT DOCUMENTS

| | | |
|---|---|---|
| 4,100,469 A | 7/1978 | Nelson |
| 4,243,894 A | 1/1981 | Kuntner |
| 4,288,828 A | 9/1981 | Kuntner |
| 4,634,951 A | 1/1987 | Kampf |
| 4,833,628 A | 5/1989 | Curran, Jr. |
| 4,996,469 A | 2/1991 | DeLange |
| 11,128,240 B1 | 9/2021 | Tang |
| 2019/0386592 A1* | 12/2019 | Mogensen .............. H02P 6/182 |

* cited by examiner

*Primary Examiner* — Muhammad S Islam
(74) *Attorney, Agent, or Firm* — Baker Botts L.L.P.

(57) ABSTRACT

A reduced voltage starter for electric motors comprises a controller, and a plurality of semiconductor switches to selectively connect a power source to a motor. The controller is configured to apply a first voltage ramp to provide a controllable fraction of the full line voltage to the motor, while maintaining a current flow to be within a programmable current limit during motor startup. The controller is further configured to implement a bumpless force transition, by applying a second voltage ramp when the speed of the motor is below the rated motor speed, and force transition criteria correlated with overheating of the semiconductor switches and/or a connected load are met.

20 Claims, 8 Drawing Sheets

APPARATUS AND METHODS FOR REDUCED VOLTAGE STARTING OF MOTORS WITH BUMPLESS FORCE TRANSITION

TECHNICAL FIELD

The present disclosure relates generally to the electric motor starting and operation. More specifically, the particular embodiments described herein relate to devices and methods for speed control and reduced voltage starting of electric motors.

BACKGROUND

Speed control of an AC motor may be implemented using adjustable frequency drives (AFDs) or reduced voltage soft starters (RVSSs). RVSSs, which may be less complex and expensive than AFDs, can be used in applications where it is desired to gradually ramp the motor up to full speed and/or gradually decelerate the motor from full speed.

In some embodiments, an RVSS may comprise semiconductors switches, such as thyristors, coupled between an AC power source and the motor. The thyristors may be selectively fired for variable time durations to control voltage and current applied to the motor. For instance, in "alpha" control schemes, a thyristor may be triggered on (or "fired") after a delay, typically expressed as an angle α (alpha) (or "firing angle") of the AC cycle, following a zero crossing of the source voltage. The thyristor may then commutate off again with reverse voltage after the current though the device goes to zero. The voltage and current supplied to the motor may therefore be varied by varying a. For instance, a motor startup procedure may involve gradually decreasing a to apply an increasing voltage ramp to the motor. When the motor reaches a desired speed, the RVSS may close a bypass contactor that bypasses the thyristors to directly connect the AC power source to the motor.

SUMMARY OF PARTICULAR EMBODIMENTS

Particular embodiments described herein provide improved starting performance of electric motors.

In particular embodiments, a motor starter may comprise a plurality of semiconductor switches capable of selectively coupling phases of an AC power source to respective phases of a motor, and a controller configured to selectively operate the semiconductor switches to gradually increase a voltage applied to the motor. In particular embodiments, the controller may be configured to maintain a current flow to the motor to be within a programmable current limit. In particular embodiments, the controller may be configured to detect a speed of the motor. In particular embodiments, the controller may be configured to determine whether the motor has reached a rated motor speed. In particular embodiments, the controller may determine whether the motor has reached a rated motor speed based on one or more root mean square (RMS) values of motor current flow.

In particular embodiments, the controller may be configured to determine if one or more force transition criteria are met, wherein the force transition criteria may be correlated with overheating of the semiconductor switches and/or a load connected to the motor. In particular embodiments, the controller may be configured to disable a programmable current limit if one or more force transition criteria are met.

In particular embodiments, one or more thresholds for meeting one or more of the force transition criteria may be predetermined. In particular embodiments, one or more thresholds for meeting one or more of the force transition criteria may be based on one or more programmable time delays or intervals. In particular embodiments, one or more thresholds for meeting one or more of the force transition criteria may be based on data correlated with a temperature of the motor. In particular embodiments, one or more thresholds for meeting one or more of the force transition criteria may be correlated with a temperature of the semiconductor switches. In particular embodiments, one or more thresholds for meeting one or more of the force transition criteria may be based on data correlated with a current flow of the semiconductor switches.

In particular embodiments, the motor starter may comprise a bypass contactor circuit configured to directly couple the full line voltage of the power source to the motor, thereby bypassing the plurality of semiconductor switches. In particular embodiments, the controller may be configured to delay activation of the bypass contactor circuit if one or more force transition criteria are met.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method and a system, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Particular embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art.

Figure 1:
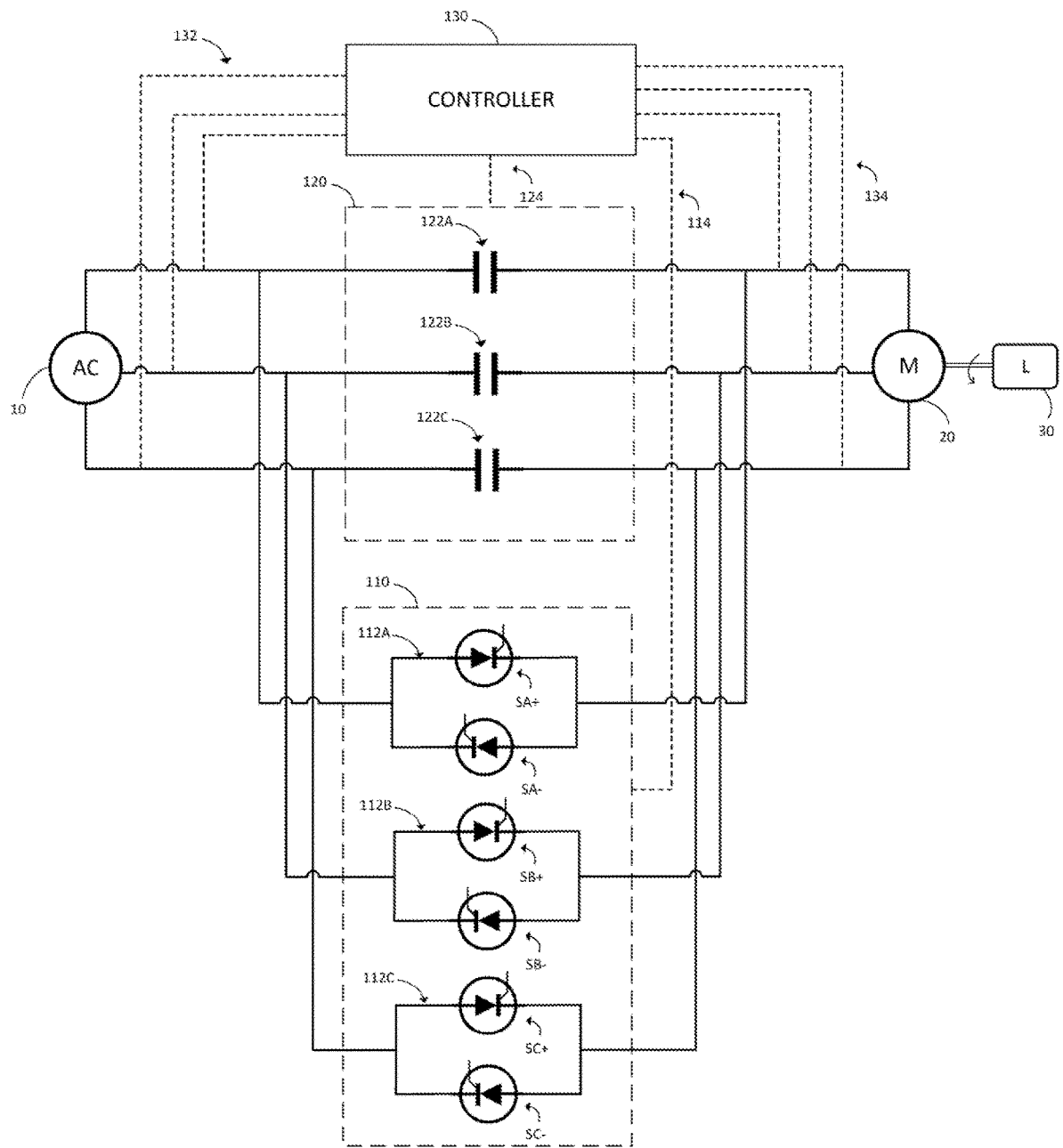
FIG. 1 is a schematic diagram illustrating a reduced voltage soft starter (RVSS) according to some embodiments.

FIG. 1 illustrates an RVSS apparatus according to particular embodiments. The apparatus may include an RVSS circuit comprising semiconductor switches 110. In particular embodiments, semiconductor switches 110 may comprise pairs 112A, 112B, and 112C of anti-parallel connected thyristors SA+/SA−, SB+/SB−, and SC+/SC−, respectively, which may be further configured to selectively couple phases of an AC power source 10 to the respective phases of a motor 20. The motor 20 may be mechanically coupled to a load 30. A bypass contactor circuit 120, which may be a three-phase contactor comprising 122A, 122B, 122C in particular embodiments, may be configured to bypass the semiconductor switches 110 under specific operating conditions to connect the full line voltage of AC power source 10 directly to the motor 20. The semiconductor switches 110 of an RVSS circuit and the bypass contactor circuit 120 may be controlled by a controller 130, each of the RVSS circuit and the bypass contactor circuit being connected to the controller by connections 114 and 124, respectively. In particular embodiments, the controller 130 may operate responsive to an AC reference signal derived from phase voltage signals 132, that may be indicative of phase voltages of the AC power source 10, for example, and/or responsive to electrical feedback signals 134, that may be indicative of phase currents of the motor 20, for example. In particular embodiments, the AC reference signal may be generated by an open-delta potential transformer for phase-lock looping purposes.

Figure 2:
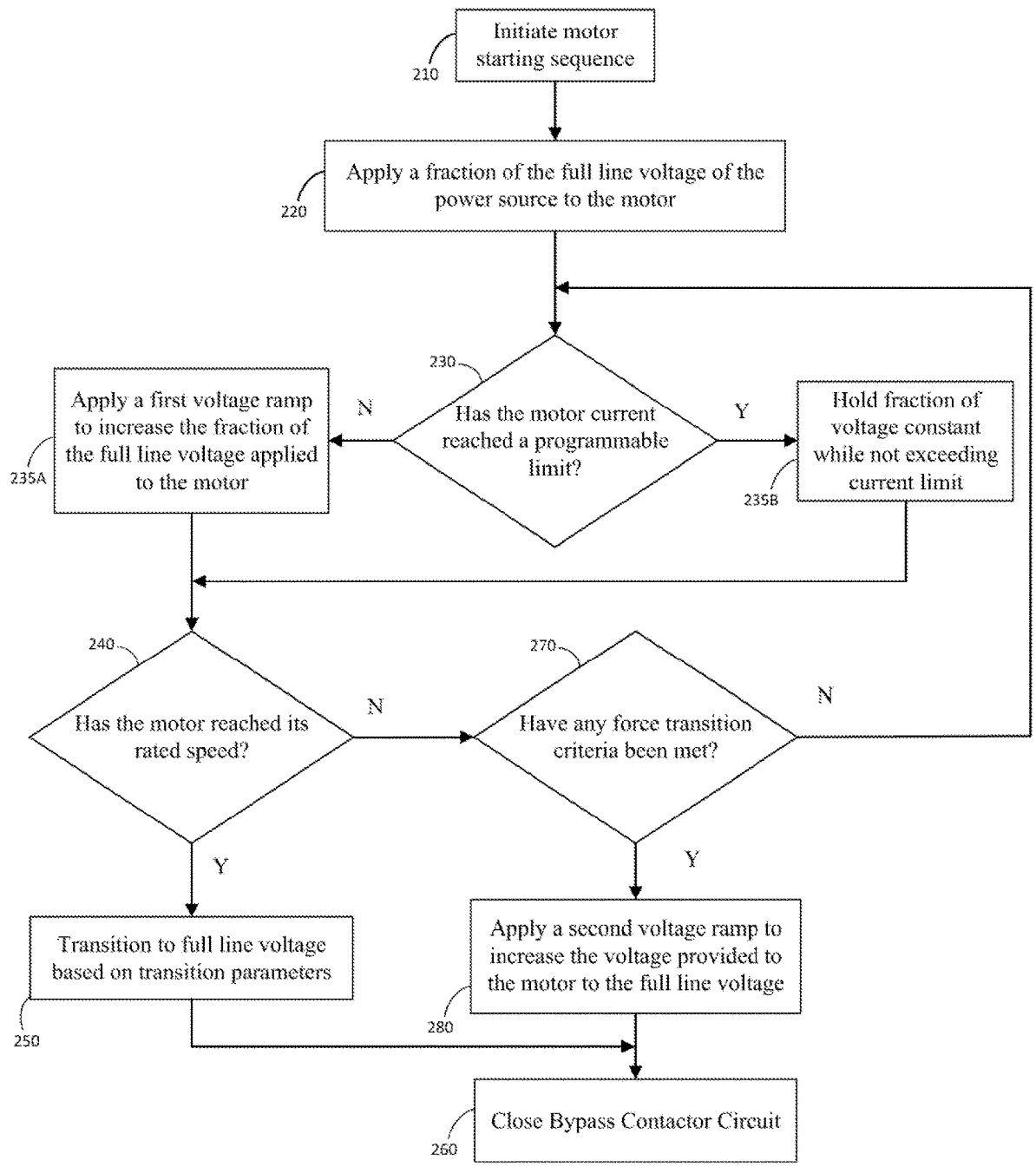
FIG. 2 is a flowchart illustrating motor starting operations of the RVSS apparatus of FIG. 1 according to some embodiments.

FIG. 2 illustrates motor startup operations that may be implemented in particular embodiments of a reduced voltage soft starter (RVSS) apparatus. Following initiation of a motor starting sequence in step 210, a controller may be configured to apply, in step 220, a controllable fraction of a full line voltage of a power source to a motor by selectively operating the semiconductor switches. In particular embodiments, the semiconductors switches may comprise pairs of thyristors, or Silicon Controlled Rectifiers (SCRs).

According to step 230, a metric of motor current flow may be monitored against a programmable current limit. If the motor current has not reached a programmable limit, a first voltage ramp may be applied (step 235A) to gradually increase the fraction of the full line voltage applied to the motor. In particular embodiments, this may be accomplished by selectively turning on pairs of thyristors during execution of the first voltage ramp, such that a firing angle α (or another methodology for triggering the thyristors) may be gradually modified. In particular embodiments, the same a firing angle may be maintained for one to multiple AC line cycles for uniform firing across all thyristors, as they get gated at different times during an AC line cycle. This may help avoid a half-wave asymmetry that can introduce a DC offset that may destabilize the motor.

According to step 235B, if the motor current is determined by the controller to have reached a programmable limit, the fraction of the full line voltage applied to the motor may be held constant while not exceeding the current limit. In particular embodiments, holding the fraction of the full line voltage constant while not exceeding the current limit may be accomplished by holding a firing angle α of activated pairs of thyristors constant.

In particular instances, with the starting motor current limited to a programmable current limit during motor acceleration, the semiconductor switches may be current limited as the motor approaches its rated speed. Several examples of this aspect of current-limited starting operation will be further illustrated later. According to step 240 of motor startup operations, the controller may determine whether the motor has reached its rated speed. In particular embodiments, a metric of motor current flow variation, such as a root mean square (RMS) current of the motor, may be monitored by the controller, for instance, by using an RMS current determination technique. According to particular embodiments, an RMS motor current may be used by the controller to relate the motor's instantaneous speed relative to its rated speed and determine if an up-to-speed detection ("UTSD") condition is met. In particular embodiments, the controller may determine that the motor has reached its rated speed based on detecting a decreasing RMS motor current after a first voltage ramp has been applied. Several examples of this aspect of a decreasing motor current as the motor approaches its rated speed will be further illustrated later.

In particular embodiments, the UTSD current threshold for this process may be relatively low. For example, the current threshold for this process may be on the order of 135% or less of a motor full rated current. In particular embodiments, a relatively low current threshold may be enabled by the use of a fast RMS current determination technique.

Following step 240, if the motor is determined to have reached its rated speed by the controller, step 250 may be initiated for transitioning the motor to the full line voltage of the power source, based and depending upon particular transition parameters. In particular embodiments, based on transition parameters, closure of the bypass contactor circuit may be initiated for transitioning the motor to the full line voltage following detection of motor up-to-speed, as in step 260. Separately or additionally, during transition to full line voltage in particular embodiments, all thyristors may be simultaneously turned on to apply full line voltage to the motor. Transitioning to firing all thyristors in this manner may reduce torque ripple and result in a smoother torque curve as the motor transitions to bypassed operation, thereby reducing mechanical stress on the motor and/or a connected load. After sufficient time has passed to ensure, for instance, that the bypass contactor circuit has fully closed, the semiconductor switches may be disconnected from the power supply and motor, and/or deactivated. In particular embodiments, a time interval for a bypass contactor circuit to fully close may be less than 200 milliseconds. In particular embodiments, a time interval for a mechanical bypass contactor circuit to fully close may be 100 to 120 milliseconds.

In particular embodiments, following step 240, if the controller determines that the motor has not reached a rated motor speed, the controller may determine whether one or more force transition criteria have been met, as in step 270. One or more force transition criteria may be correlated with overheating of the semiconductor switches, and/or of a load that may be connected to the motor. If a force transition condition has not occurred, the controller may check whether the motor current has yet reached its programmable current limit (step 230), and depending on the relative motor current, may either continue to apply a first voltage ramp to increase the fraction of the full line voltage applied to the motor (Step 235A), or hold the fraction of voltage constant while not exceeding the current limit (235B).

As discussed above, in particular embodiments, following a determination of the motor not having reached its rated speed, a condition where one or more force transition criteria are met may occur. For instance, such a force transition may be based on a high inertia and/or heavy load being connected to the motor. For instance, if a load connected to the motor is a high inertia and/or a large or heavy load, the time taken for the accelerating motor to approach its rated speed may be long enough for the semiconductor switches and/or the load to exceed their thermal ratings, or otherwise overheat.

If a condition where one or more force transition criteria are met occurs, it is possible for the controller to initiate immediate transition to connecting the full line voltage of the power source to the motor. For example, transitioning to a full line voltage may involve closing the bypass contactor circuit to disengage the semiconductor switches from the motor starting circuit, and directly connect the motor to the full line voltage instantaneously. However, immediately transitioning to a full line voltage based on meeting one or more force transition criteria, such as described, may be correlated with a motor that is still accelerating and has not reached its rated speed. Additionally, such a situation may be correlated with a heavy and/or high inertia load being connected to the motor. In other words, the motor and the connected load may still require significant additional energy input to fully come up to rated speed. As a result, transitioning to a full line voltage under these conditions where the motor is still coming up to speed may involve a significant jump and/or disturbance in electromagnetic torque and motor current, referred to herein as a "bump" in the force transition, thereby potentially inducing significant undesirable mechanical stress on the motor and/or a connected load, and/or electrical noise in the circuit.

In particular embodiments, in response to determining that one or more force transition criteria are met, the controller may apply a second voltage ramp (step 280) to increase the voltage provided to the motor to the full line voltage, which is referred to herein as a "bumpless" transfer to soften the force transition. Since force transition criteria may be triggered based on overheating concerns with the semiconductor switches and/or the connected load, a bumpless force transition may occur over a relatively short period of time. In particular embodiments, the second voltage ramp rate may exceed the first voltage ramp rate. Separately or additionally, one or more thresholds for meeting one or more of the force transition criteria may be determined to accommodate the margins and relative operational proximity to thermal limits of components to be protected from overheating, the ongoing and expected pending current flow rates, the time interval remaining to up-to-speed and/or full voltage conditions, and/or time estimates for key events pending between force transition and steady-state operation.

As an illustration, if instantaneous full voltage transition based on bypass contactor operation were implemented, the thermal margins for protecting components such as the semiconductor switches may need be only sufficient for fewer operations and/or lower expected current over shorter periods of time. For example, based on the estimated time required for a mechanical bypass contactor to close, additional thermal loads for a brief time interval less than 200 milliseconds of additional current flow through the semiconductor switches may need to be accounted for during transition. As a result, transition criteria for a conventional force transition (i.e., with a bump) may be determined to be correlated with relatively higher fractional cutoff values of component thermal trip level(s), for example, 95% of the ultimate trip level(s).

In contrast, for a bumpless force transition, additional time may be needed to accommodate the additional thermal loads accrued through the duration of a second voltage ramp. Additionally or separately, force transition criteria may be triggered due to a heavy, large, and/or high inertia load, which may draw higher motor currents during transition. Additionally or separately, based on the above loading, the motor may be at a lower fraction of its rated speed at force transition, and may draw higher motor currents throughout the transition.

Additionally or separately, in particular embodiments, a programmable current limit may be briefly disabled by the controller during a bumpless force transition. Additionally or separately, in particular embodiments, activating or operating a bypass contactor circuit may be delayed by the controller during a bumpless force transition. Due to at least some of the above factors and/or additional factors, significant care may need to be taken to protect key components from the risk of thermal overloading. In particular embodiments, one or more thresholds for meeting one or more force transition criteria may be determined by the controller accordingly. As a result, transition criteria for a bumpless force transition may be determined to be correlated with relatively lower fractional cutoff value(s) of component thermal trip level(s), for example, 80% or 85% of the ultimate trip level(s).

Additionally or separately, mechanical torque oscillations and overshoots may occur during transitions from soft starting to a full line voltage, which may create uncertainties in the transition. While startup operations may be particularly susceptible to such oscillations in low inertia and/or low load situations, a significant tendency toward torque oscillations may also occur in particular situations of loads that combine low inertia with heavy/large loads, such as with pump-like loads that have low inertia-to-load ratios. In particular embodiments, a tendency for mechanical torque oscillations may be significantly reduced by limiting a duration of the second voltage ramp to be less than or substantially equal to a stator time constant of the motor:

$$\tau_{stator} = (L_s + L_m)/R_s,$$

wherein $L_s$ is a stator self-inductance, $L_m$ is a magnetizing inductance, and $R_s$ is a stator resistance as defined by the equivalent circuit for an induction motor according to IEEE Standard 112. In particular embodiments, a medium-voltage induction motor may have a stator time constant in a range from about 800 milliseconds to about 1.8 seconds.

In particular embodiments, one or more thresholds for meeting one or more of the force transition criteria may be predetermined. For example, a run transition timer may be set to have a predetermined delay corresponding to a predetermined expected time duration limit, beyond which limit the semiconductor switches and/or the connected load may be reasonably expected to exceed their thermal ratings. In particular embodiments, a predetermined delay for a run transition timer may be empirically determined.

In particular embodiments, one or more thresholds for meeting one or more of the force transition criteria may be based on one or more programmable time intervals, such as a time delay. In particular embodiments, a value for a run transition timer delay may be lowered from a high value (such as 999 seconds, intended to be indefinite) to a predetermined value, and/or a programmable value, and/or a value determined by the controller based on sensor input and/or other parameters.

In particular embodiments, one or more thresholds for meeting one or more of the force transition criteria may be based on data correlated with a temperature of the motor. In particular embodiments, one or more thresholds for meeting one or more of the force transition criteria may be based on the fractional level of a motor thermal bucket that has accrued, relative to a critical trip value. In particular embodiments, data correlated with a temperature of the motor may be based on using one or more temperature sensors for detecting one or more temperatures associated with the motor and/or related heat sinks. In particular embodiments, data correlated with a temperature of the motor may be separately or additionally based on detecting other quantities associated with the temperature and/or thermal status and evolution of the motor. In particular embodiments, one or more measures of motor current flow, and/or a measure of time duration of a current flow may be used to determine one or more thresholds for meeting the force transition criteria. For instance, in particular embodiments, an RMS current measurement or a current-squared measurement may be used, which may be optionally combined with an indication of elapsed time of motor startup.

In particular embodiments, one or more thresholds for meeting one or more of the force transition criteria may be determined by the controller based on data correlated with a temperature of the semiconductor switches. In particular embodiments, data correlated with a temperature of the semiconductor switches may be based on using one or more temperature sensors for detecting one or more temperatures associated with the semiconductor switches and/or related heat sinks. In particular embodiments, data correlated with a temperature of the semiconductor switches may be separately or additionally based on detecting other quantities associated with the temperature and/or thermal status and evolution of the semiconductor switches. In particular embodiments, one or more measures of current flow of the semiconductor switches, and/or a measure of a time duration of a current flow may be used by the controller to determine one or more thresholds for meeting one or more of the force transition criteria. For instance, in particular embodiments, an RMS current measurement or a current-squared measurement may be used, which may be optionally combined with an indication of elapsed time of motor startup.

As discussed, in particular embodiments, in response to determining that one or more force transition criteria are met, the controller may apply a second voltage ramp (step 280) to increase the voltage provided to the motor to the full line voltage, in a "bumpless" transfer to soften the force transition. Following a bumpless force transition to steady-state operational parameters based on motor speed, current, and/or applied voltage, the controller may close the bypass contactor circuit (step 260) to disconnect the semiconductor switches and directly apply the full line voltage of the power source to the motor.

Figure 3:
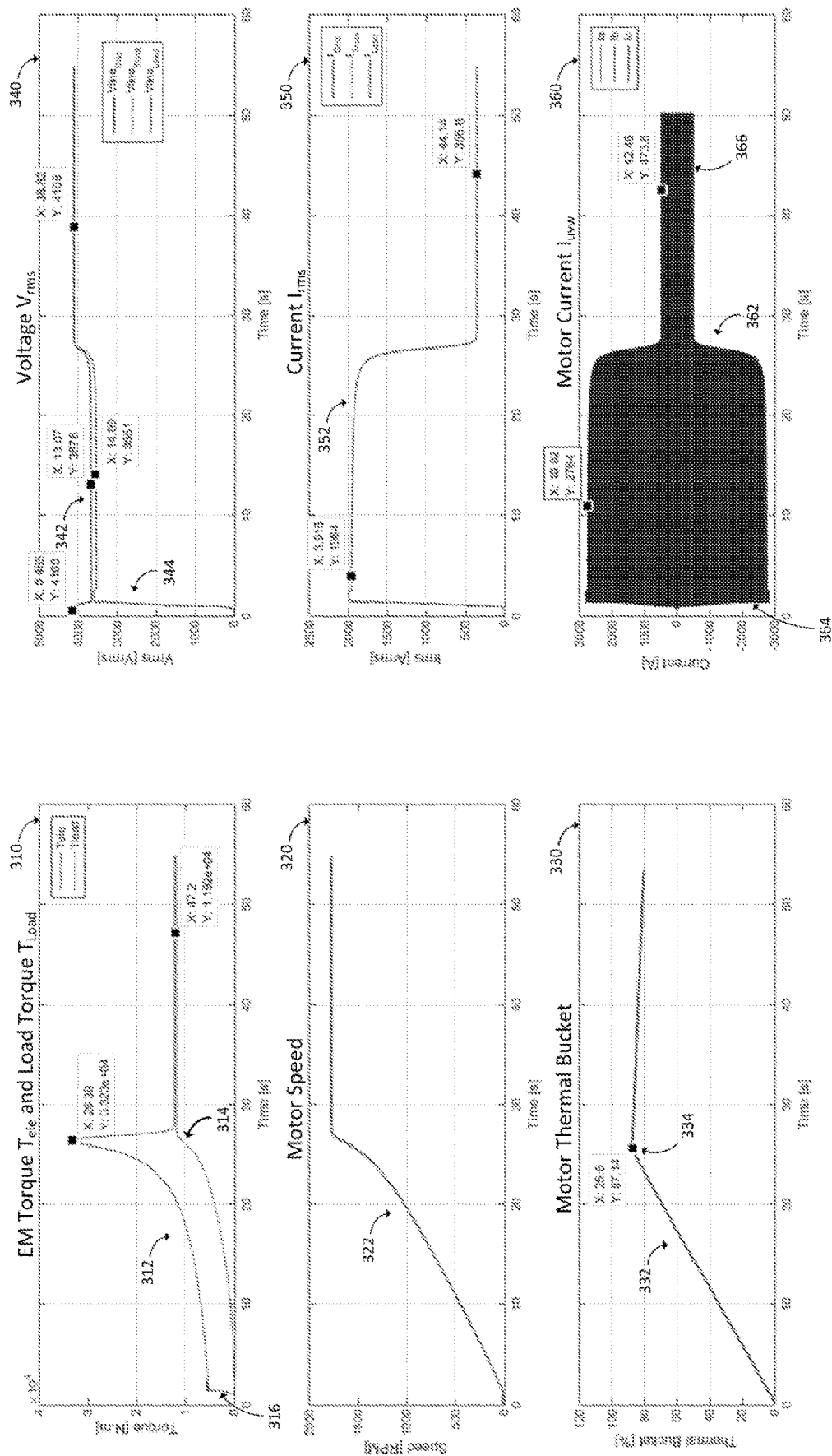
FIG. 3 comprises graphs illustrating torque, speed, thermal bucket, voltage, and current for a full voltage motor starting operation, according to some embodiments.

FIG. 3 comprises graphs illustrating torque, speed, thermal bucket, voltage, and current for a full line voltage motor starting operation, according to some embodiments. In a full line voltage startup operation, a reduced voltage soft starter is not used, and the full line voltage is directly and immediately applied to the motor at rest to accelerate it to rated speed. In the illustrated embodiments in FIG. 3, a programmable current limit is also not applied during startup and motor acceleration.

310 illustrates the electromagnetic torque 312 and the load torque 314 for a particular embodiment, in N·m ($\times 10^4$), as functions of time during motor startup. 320 illustrates the motor speed 322 for a particular embodiment, in revolutions per minute, as a function of time during motor startup. 330 illustrates the evolution of fraction of a motor thermal bucket 332 that has accrued based on current flow and thermal energy accumulation, for a particular embodiment, as a percentage (%) of a maximum motor thermal bucket, as a function of time during motor startup. 340 illustrates an RMS grid line voltage 342 and an RMS load line voltage 344 for a particular embodiment, in RMS Volts ($V_{RMS}$), as a function of time during motor startup. 350 illustrates RMS current flows 352 for a particular embodiment, in RMS Amperes ($A_{RMS}$), as a function of time during motor startup. 360 illustrates motor current flows $I_{uvw}$ for a particular embodiment, in Amperes (A), as a function of time during motor startup.

During the full line voltage startup illustrated in FIG. 3, over the duration of the first few seconds (t=0 to 2 s, for example) after startup is initiated, a very steep rise rate in voltage 344 is seen to be applied to the motor. Currents 352 and 362 (at 364, for example) and the electromagnetic torque 312 generated corresponding rise sharply (at 316) from their zero starting values, while the RMS grid line voltage 342 drops slightly during the same time interval.

The initial current amplitudes seen in 350 or 360 during the first few seconds (t=0 to 10 s, for example) of startup are seen to be many times larger (nearly six times, for example) than the steady-state currents that the motor draws when it has completed acceleration and is at rated speed (t>30 s, for example). In this example of FIG. 3, the short time taken to accelerate to rated speed is at least based on the ability of the motor to draw very large currents during startup (i.e., without a programmed current limit), and/or the nature of the load connected to the motor. In this example, the thermal bucket is seen to rise during the first ~25.6 s (at 334), as the accumulation of thermal energy in the motor thermal bucket during the large current flows over a short period of time exceeds the loss of thermal energy. Following the peak value at 334, in this example, the motor thermal bucket is seen to not rise further or exceed its 100% limit, starting to drop for t>25.6 s, while the motor current begins to steeply decreases to its steady-state value 366 as the motor approaches and attains its rated speed.

Figure 4:
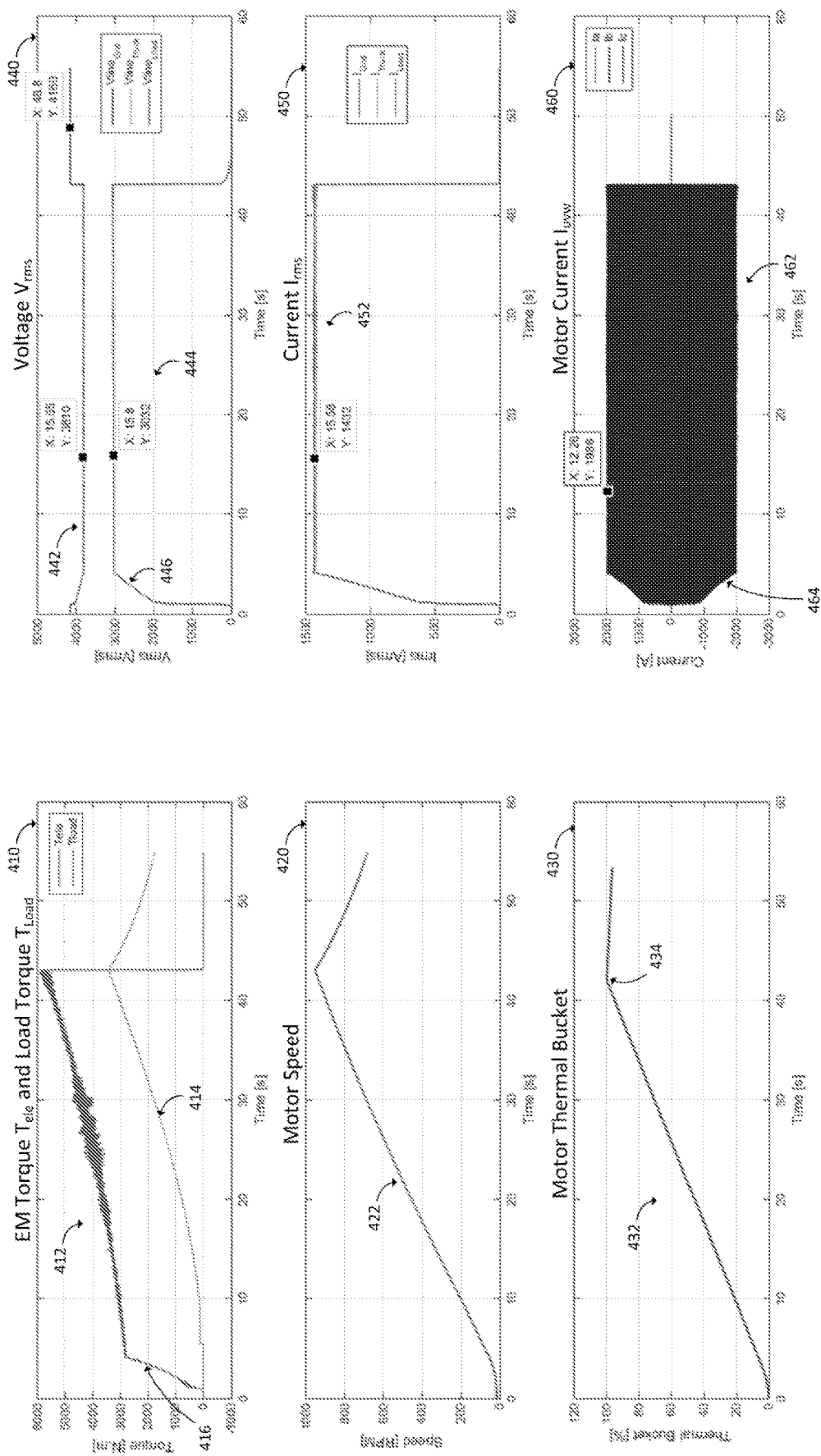
FIG. 4 comprises graphs illustrating torque, speed, thermal bucket, voltage, and current for a reduced voltage motor starting operation, without a programmable current limit enforced, according to some embodiments.

FIG. 4 comprises graphs illustrating torque, speed, thermal bucket, voltage, and current for a reduced voltage motor starting operation, with motor current limited to a programmable value, according to some embodiments.

410 illustrates the electromagnetic torque 412 and the load torque 414 for a particular embodiment, in N·m, as functions of time during motor startup. 420 illustrates the motor speed 422 for a particular embodiment, in revolutions per minute, as a function of time during motor startup. 430 illustrates the evolution of fraction of a motor thermal bucket 432 that has accrued based on current flow and thermal energy accumulation, for a particular embodiment, as a percentage (%) of a maximum motor thermal bucket, as a function of time during motor startup. 440 illustrates an RMS grid line voltage 442 and an RMS load line voltage 444 for a particular embodiment, in RMS Volts ($V_{RMS}$), as a function of time during motor startup. 450 illustrates RMS current flows 452 for a particular embodiment, in RMS Amperes ($A_{RMS}$), as a function of time during motor startup. 460 illustrates motor current flows $I_{uvw}$ for a particular embodiment, in Amperes (A), as a function of time during motor startup.

During the first few moments (t=0 to 5 seconds, for example) of the reduced voltage startup illustrated in FIG. 4, the initial rise rate of voltage 444 applied to the motor, currents 452 and 462, and electromagnetic torque 412 generated are less steep, distributed over a longer interval of time (t=0 to 5 seconds, for example), and have lower peak values than their counterparts during the corresponding initial time interval of the full voltage startup example illustrated in FIG. 3. In particular, a first voltage ramp 446 for gradually increasing the fraction of the full line voltage that is applied to the motor is illustrated, with a corresponding gradually increasing current profile 464.

In this example for FIG. 4, based at least on the programmed current limits imposed (~1986 A seen as a maximum near-constant value in 460, for example) and the nature of the connected load, the motor is seen to be still accelerating when the motor thermal bucket 432 reaches its 100% limit (at t=~42 seconds at 434, in this example), leading to a trip event disconnecting power to the motor. The voltage 444 applied to the motor and currents 452 and 462 can be seen to suddenly drop to zero following this thermal trip event at t=~42 seconds.

Figure 5:
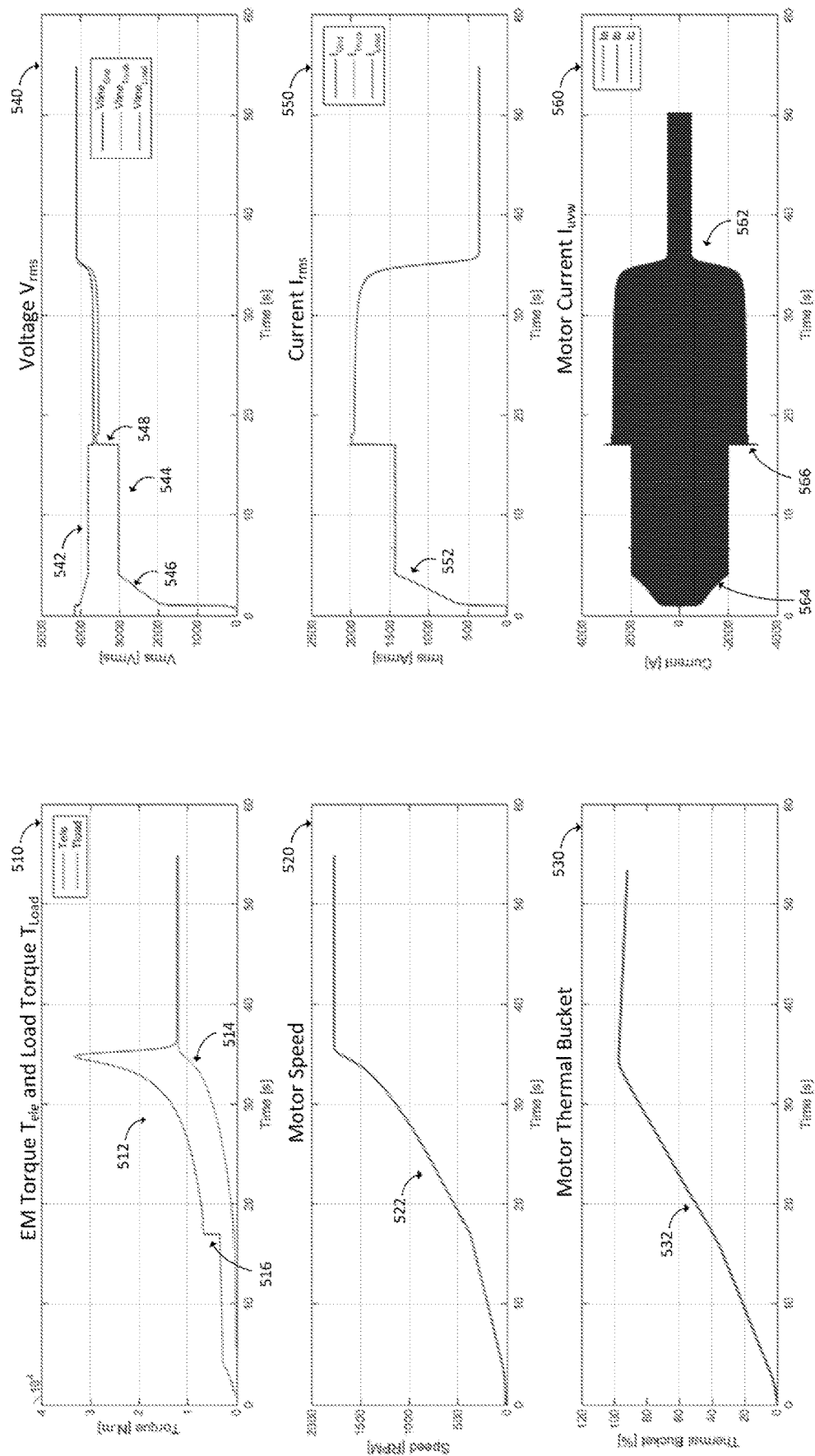
FIG. 5 comprises graphs illustrating torque, speed, thermal bucket, voltage, and current for a reduced voltage motor starting operation, with a force transition (with a bump) based on a predetermined time delay, and with motor current limited to a programmable limit, according to some embodiments.

FIG. 5 comprises graphs illustrating torque, speed, thermal bucket, voltage, and current for a reduced voltage motor starting operation, with a force transition (with a bump) based on a predetermined time delay, and with motor current limited to a programmable limit, according to some embodiments.

510 illustrates the electromagnetic torque 512 and the load torque 514 for a particular embodiment, in N·m ($\times 10^4$), as functions of time during motor startup. 520 illustrates the motor speed 522 for a particular embodiment, in revolutions per minute, as a function of time during motor startup. 530 illustrates the evolution of fraction of a motor thermal bucket 532 that has accrued based on current flow and thermal energy accumulation, for a particular embodiment, as a percentage (%) of a maximum motor thermal bucket, as a function of time during motor startup. 540 illustrates an RMS grid line voltage 542 and an RMS load line voltage 544 for a particular embodiment, in RMS Volts ($V_{RMS}$), as a function of time during motor startup. 550 illustrates RMS current flows 552 for a particular embodiment, in RMS Amperes ($A_{RMS}$), as a function of time during motor startup. 560 illustrates motor current flows $I_{uvw}$ for a particular embodiment, in Amperes (A), as a function of time during motor startup.

During the first few moments (t=0 to 5 seconds, for example) of the reduced voltage startup illustrated in FIG. 5, the initial rise rate of voltage 544 applied to the motor, currents 552 and 562, and electromagnetic torque 512 generated are less steep, distributed over a longer period of time (t=0 to 5 seconds, for example), and have lower peak values than their counterparts during the first few moments of the full voltage startup example illustrated in FIG. 3. In particular, a first voltage ramp 546 for gradually increasing the fraction of the full line voltage that is applied to the motor is illustrated, with a corresponding gradually increasing current profile 564.

In this example of FIG. 5, based at least on the programmed current limits enforced (~2000 A seen as a maximum near-constant value in 560, for example, at ~5 s<t<~17 s) and the nature of the connected load, the motor is seen to be still accelerating when a predetermined time delay is reached (at t=~17 seconds, selected in this example for illustration), leading to a force transition and relatively abrupt connection, with a bump 548 at t=~17 s, of the full line voltage applied to the motor. In particular embodiments, a predetermined time delay may be used based on empirical estimates of acceleration time needed for a given connected load, and/or expectation of overheating of the semiconductor switches and/or the connected load. In particular embodiments, an abrupt connection with a bump, as illustrated here, may be based on instantaneously engaging the bypass contactor circuit to bypass the semiconductor switches and the RVSS circuit. The bump manifests at least as a sharp, sudden change in electromagnetic torque 516, and/or a sharp, sudden change in motor current 566. A bump involving such a significant jump and/or disturbance in electromagnetic torque and motor current may induce significant undesirable mechanical stress on the motor and/or a connected load, and/or electrical noise in the circuit.

Figure 6:
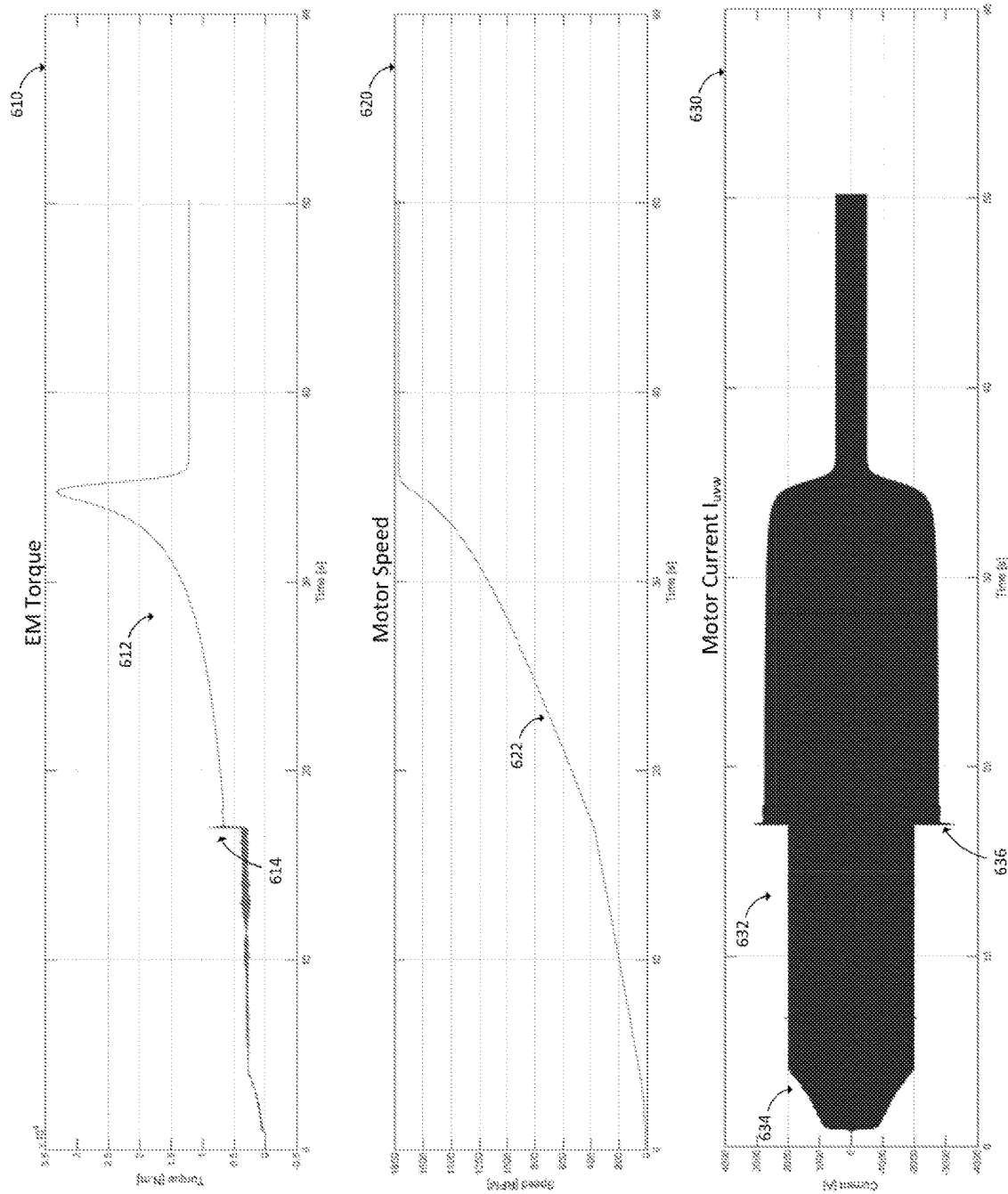
FIG. 6 comprises graphs illustrating details of torque, speed, and current for a reduced voltage motor starting operation, with a force transition (with a bump) based on a predetermined time delay, and with motor current limited to a programmable limit, according to some embodiments.

FIG. 6 comprises graphs illustrating details of torque, speed, and current for a reduced voltage motor starting operation, with a force transition (with a bump) based on a predetermined time delay, and with motor current limited to a programmable limit, according to some embodiments. Higher resolutions and/or sampling rates used in FIG. 6 enable a more detailed illustration of the features discussed in FIG. 5.

610 illustrates details of the electromagnetic torque 612 for a particular embodiment, in N·m ($\times 10^4$), as functions of time during motor startup. 620 illustrates details of motor speed 622 for a particular embodiment, in revolutions per minute, as a function of time during motor startup. 630 illustrates details of motor current flows $I_{uvw}$ for a particular embodiment, in Amperes (A), as a function of time during motor startup.

During the first few moments (t=0 to 5 seconds, for example) of the reduced voltage startup illustrated in FIG. 6, the initial rise rate of motor current 632 and electromagnetic torque 612 generated are less steep, distributed over a longer period of time (t=0 to 5 seconds, for example), and have lower peak values than their counterparts during the first few moments of the full voltage startup example illustrated in FIG. 3. In particular, a first voltage ramp of voltage for gradually increasing the fraction of the full line voltage that is applied to the motor corresponds to the motor current profile 634. Based at least on the programmed current limits imposed (~2000 A seen as a maximum near-constant value in 632, for example, at ~5 s<t<~17 s) and the nature of the connected load, the motor is seen to be still accelerating when a predetermined time delay is reached (at t=~17 seconds, in this example), leading to a force transition and relatively abrupt connection, with a bump, of a full line voltage applied to the motor. The bump manifests at least as a sharp, sudden change in electromagnetic torque 614, and/or a sharp, sudden change in motor current 636.

Figure 7:
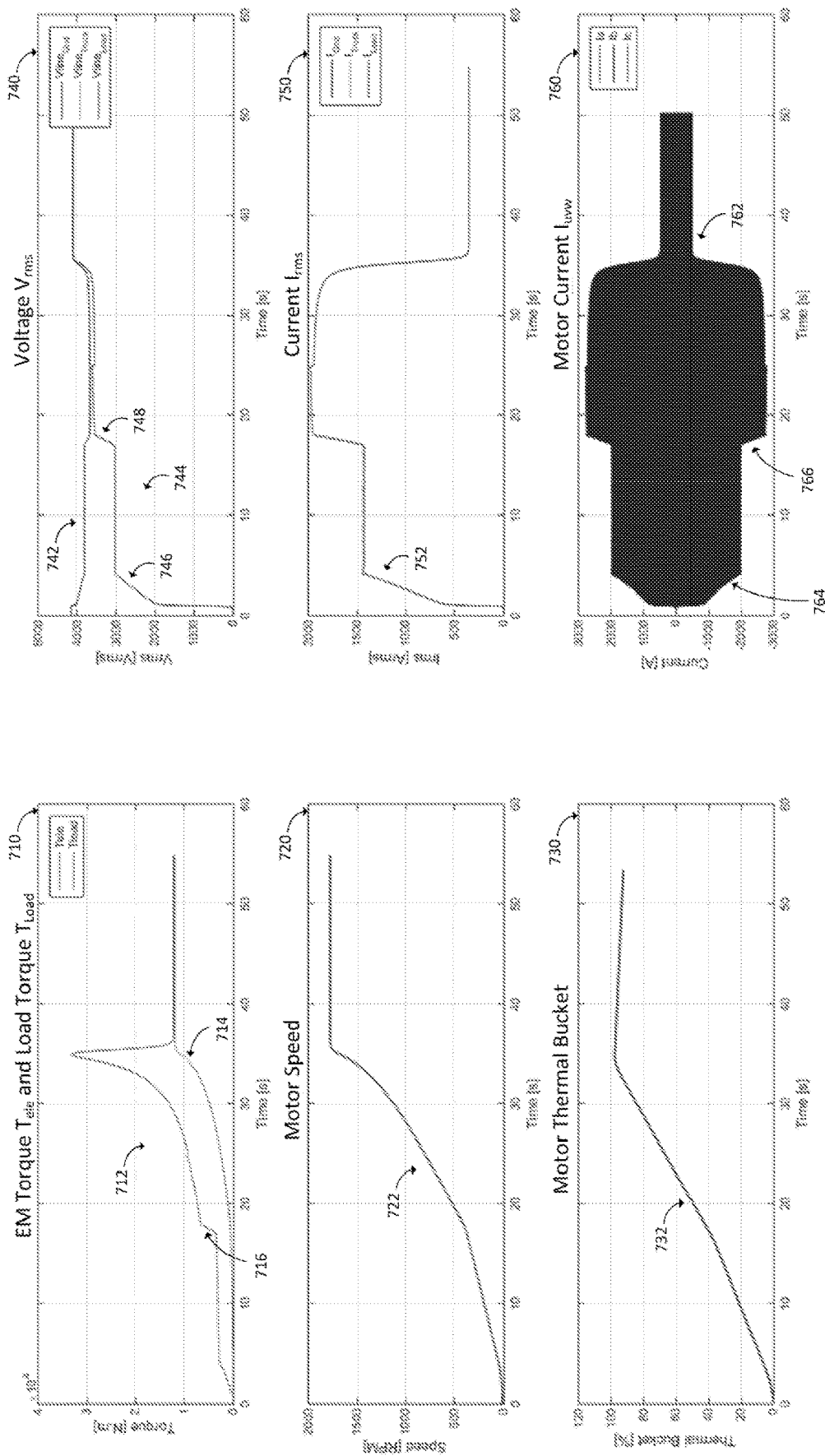
FIG. 7 comprises graphs illustrating torque, speed, thermal bucket, voltages, and currents for a reduced voltage motor starting operation, with a bumpless force transition, and with motor current limited to a programmable limit, according to some embodiments.

FIG. 7 comprises graphs illustrating torque, speed, thermal bucket, voltages, and currents for a reduced voltage motor starting operation, with a bumpless force transition, and with motor current limited to a programmable limit, according to some embodiments.

710 illustrates the electromagnetic torque 712 and the load torque 714 for a particular embodiment, in N·m (×10⁴), as functions of time during motor startup. 720 illustrates the motor speed 722 for a particular embodiment, in revolutions per minute, as a function of time during motor startup. 730 illustrates the evolution of fraction of a motor thermal bucket 732 that has accrued based on current flow and thermal energy accumulation, for a particular embodiment, as a percentage (%) of a maximum motor thermal bucket, as a function of time during motor startup. 740 illustrates an RMS grid line voltage 742 and an RMS load line voltage 744 for a particular embodiment, in RMS Volts ($V_{RMS}$), as a function of time during motor startup. 750 illustrates RMS current flows 752 for a particular embodiment, in RMS Amperes ($A_{RMS}$), as a function of time during motor startup. 760 illustrates motor current flows $I_{uvw}$ for a particular embodiment, in Amperes (A), as a function of time during motor startup.

During the first few moments (t=0 to 5 seconds, for example) of the reduced voltage startup illustrated in FIG. 7, the initial rise rate of voltage 744 applied to the motor, currents 752 and 762, and electromagnetic torque 712 generated are less steep, distributed over a longer period of time (t=0 to 5 seconds, for example), and have lower peak values than their counterparts during the first few moments of the full voltage startup example illustrated in FIG. 3. In particular, a first voltage ramp 746 for gradually increasing the fraction of the full line voltage applied to the motor is illustrated, with a corresponding current profile 764.

In this example of FIG. 7, based at least on the programmed current limits enforced (~2000 A seen as maximum near-constant value in 760, for example, at ~5 s<t<~17 s) and the nature of the connected load, the motor is seen to be still accelerating when a predetermined time delay is reached (at t=~17 seconds, selected in this example for illustration). In this bumpless force transition illustrated in FIG. 7, instead of engaging the bypass contactor circuit immediately, the controller selectively operates the semiconductor switches to apply a second voltage ramp 748 to the motor over a brief time interval, to transition in a bumpless manner to the full line voltage. The second voltage ramp 748 is illustrated in this example as somewhat steeper, and of shorter time duration, than the first voltage ramp 746. Additionally, the programmable current limit is briefly disabled by the controller in this example. For instance, motor current 762 is seen to be a significantly higher value following the bumpless force transition (for instance, ~19 s<t<~30 s) than the programmable current-limit value seen between the first and second voltage ramps (for example, ~5 s<t<~17 s).

The bumpless force transition illustrated correspondingly produces a significantly smoother electromagnetic torque transition 716, and significantly smoother motor current transition 766, relative to the force transition illustrated in FIG. 5. As a result, the bumpless force transition significantly reduces any undesirable mechanical stress on the motor and/or a connected load, and/or electrical noise in the circuit due to the force transition.

Figure 8:
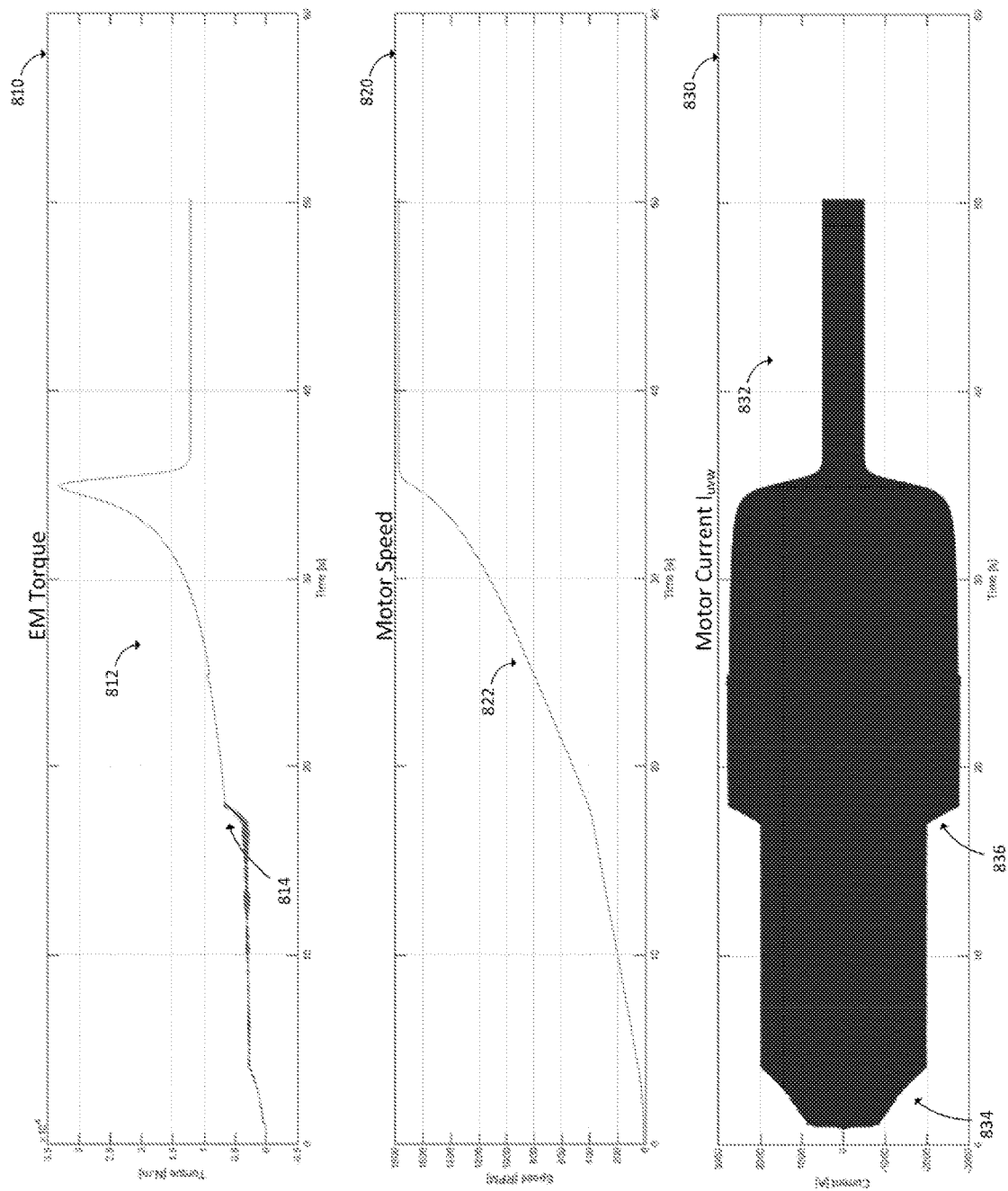
FIG. 8 comprises graphs illustrating details of torque, speed, and current for a reduced voltage motor starting operation, with a bumpless force transition, and with motor current limited to a programmable limit, according to some embodiments.

FIG. 8 comprises graphs illustrating details of torque, speed, and current for a reduced voltage motor starting operation, with bumpless force transition, and with motor current limited to a programmable limit, according to some embodiments. Higher resolutions and/or sampling rates used in FIG. 8 enable a more detailed illustration of the features discussed in FIG. 7.

810 illustrates details of the electromagnetic torque 812 for a particular embodiment, in N·m (×10⁴), as functions of time during motor startup. 820 illustrates details of motor speed 822 for a particular embodiment, in revolutions per minute, as a function of time during motor startup. 830 illustrates details of motor current flows $I_{uvw}$ for a particular embodiment, in Amperes (A), as a function of time during motor startup.

During the first few moments (t=0 to 5 seconds, for example) of the reduced voltage startup illustrated in FIG. 8, the initial rise rate of current 832 and electromagnetic torque 812 generated are less steep, distributed over a longer period of time (t=0 to 5 seconds, for example), and have lower peak values than their counterparts during the first few moments of the full voltage startup example illustrated in FIG. 3. In particular, a first voltage ramp of voltage for gradually increasing the fraction of the full line voltage that is applied to the motor corresponds to the motor current profile 834. Based at least on the programmed current limits imposed (~2000 A seen as maximum near-constant value in 832, for example, at ~5 s<t<~17 s) and the nature of the connected load, the motor is seen to be still accelerating when a predetermined time delay is reached (at t=~17 seconds, for example). In this bumpless force transition illustrated in FIG. 8, instead of engaging the bypass contactor circuit immediately, the controller selectively operates the semiconductor switches to apply a second voltage ramp to the motor over a brief time interval, where the second ramp is steeper and of shorter duration in this example than the first voltage ramp, to transition in a bumpless manner to the full line voltage. Additionally, the programmable current limit is briefly disabled by the controller in this example. For instance, motor current 832 is seen to be a significantly higher value following the bumpless force transition (for instance, ~19 s<t<~30 s) than the programmable current-limited value seen between the first and second voltage ramps (for example, ~5 s<t<~17 s).

The bumpless force transition illustrated indicates significantly a smoother electromagnetic torque transition 814, and significantly smoother motor current transition 836, relative to the force transition illustrated in FIG. 6. As a result, the bumpless force transition significantly reduces any undesirable mechanical stress on the motor and/or a connected load, and/or electrical noise in the circuit due to the force transition.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

What is claimed is:

1. A motor starter comprising:
   a plurality of semiconductor switches configured to selectively connect a power source to a motor; and
   a controller configured to operate the semiconductor switches to apply a controllable fraction of a full line voltage of the power source to the motor, wherein the controller is further configured to:
      apply a first voltage ramp to cause a voltage to be provided from the power source to the motor while maintaining a current flow to the motor to be within a programmable current limit;
      determine, based on detecting a speed of the motor, whether the motor has reached a rated motor speed;
      determine, in response to determining that the speed of the motor is below the rated motor speed, whether one or more force transition criteria are met, wherein the one or more force transition criteria are correlated with overheating of the semiconductor switches or overheating of a load connected to the motor; and
      apply, in response to determining that the one or more force transition criteria are met, a second voltage ramp to increase the voltage provided to the motor to the full line voltage.

2. The motor starter of claim 1, wherein a second voltage ramp rate associated with the second voltage ramp exceeds a first voltage ramp rate associated with the first voltage ramp.

3. The motor starter of claim 1, wherein a duration of the second voltage ramp is substantially equal to or less than a stator time constant of the motor.

4. The motor starter of claim 1, wherein one or more thresholds for meeting one or more of the force transition criteria are predetermined.

5. The motor starter of claim 1, wherein the controller is further configured to determine one or more thresholds for meeting one or more of the force transition criteria based on one or more programmable time intervals.

6. The motor starter of claim 1, wherein the controller is further configured to determine one or more thresholds for meeting one or more of the force transition criteria based on data correlated with a temperature of the motor.

7. The motor starter of claim 1, wherein the controller is further configured to determine one or more thresholds for meeting one or more of the force transition criteria based on data correlated with a temperature of the semiconductor switches.

8. The motor starter of claim 1, wherein the controller is further configured to determine one or more thresholds for meeting one or more of the force transition criteria based on data correlated with a current flow of the semiconductor switches.

9. The motor starter of claim 1, wherein the determination of whether the motor has reached a rated motor speed is based on one or more root mean square (RMS) current values of the current flow to the motor.

10. The motor starter of claim 1, wherein based on determining that one or more force transition criteria have been met, the controller is further configured to disable the programmable current limit.

11. The motor starter of claim 1 further comprising a bypass contactor circuit, wherein the bypass contactor circuit, when activated by the controller, is configured to bypass the semiconductor switches by directly coupling the full line voltage of the power source to the motor.

12. The motor starter of claim 11, wherein based on determining that one or more of the force transition criteria have been met, the controller is further configured to delay activation of the bypass contactor circuit.

13. A method of starting a motor, comprising:
   operating, by a controller, a plurality of semiconductor switches to apply a controllable fraction of a full line voltage of a power source to the motor;
   applying, by the controller, a first voltage ramp to cause a voltage to be provided from the power source to the motor while maintaining a current flow to the motor to be within a programmable current limit;
   determining, by the controller and based on detecting a speed of the motor, whether the motor has reached a rated motor speed;
   determining, by the controller and based on determining that the speed of the motor is below the rated motor speed, whether one or more force transition criteria are met, wherein the one or more force transition criteria are correlated with overheating of the semiconductor switches or overheating of a load connected to the motor; and
   applying, by the controller and based on determining that one or more force transition criteria have been met, a second voltage ramp to increase the voltage provided to the motor to the full line voltage.

14. The method of claim 13, wherein a second voltage ramp rate associated with the second voltage ramp exceeds a first voltage ramp rate associated with the first voltage ramp.

15. The method of claim 13, wherein a duration of the second voltage ramp is substantially equal to or less than a stator time constant of the motor.

16. The method of claim 13, wherein the controller is further configured to determine one or more thresholds for meeting one or more of the force transition criteria based on data correlated with a temperature of the semiconductor switches.

17. The method of claim 13, wherein the controller is further configured to determine one or more thresholds for meeting one or more of the force transition criteria based on data correlated with a current flow of the semiconductor switches.

18. The method of claim 13, wherein the determination of whether the motor has reached a rated motor speed is based on one or more root mean square (RMS) current values of the current flow to the motor.

19. The method of claim 13, wherein based on determining that one or more force transition criteria have been met, the controller is further configured to disable the programmable current limit.

20. The method of claim 13, further comprising a bypass contactor circuit, wherein the bypass contactor circuit, when activated by the controller, is configured to bypass the semiconductor switches by directly coupling the full line voltage of the power source to the motor, and wherein, based on determining that one or more of the force transition criteria have been met, the controller is further configured to delay activation of the bypass contactor circuit.

* * * * *